United States Patent
Mordani et al.

(10) Patent No.: US 11,082,303 B2
(45) Date of Patent: Aug. 3, 2021

(54) REMOTELY HOSTED MANAGEMENT OF NETWORK VIRTUALIZATION

(71) Applicant: VMware, Inc., Palo Alto, CA (US)

(72) Inventors: Rajiv Mordani, Fremont, CA (US); Joshua Lee Dorr, San Jose, CA (US); Amarnath Palavalli, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/518,561

(22) Filed: Jul. 22, 2019

(65) Prior Publication Data
US 2021/0029000 A1 Jan. 28, 2021

(51) Int. Cl.
*H04L 29/06* (2006.01)
*H04L 12/24* (2006.01)
*G06F 9/455* (2018.01)
*G06F 9/451* (2018.01)

(52) U.S. Cl.
CPC ........... *H04L 41/28* (2013.01); *G06F 9/451* (2018.02); *G06F 9/45558* (2013.01); *H04L 41/08* (2013.01); *H04L 41/0893* (2013.01); *H04L 41/20* (2013.01); *H04L 41/22* (2013.01); *H04L 63/0263* (2013.01); *H04L 63/08* (2013.01); *H04L 63/10* (2013.01); *G06F 2009/45595* (2013.01)

(58) Field of Classification Search
CPC . H04L 41/08; H04L 41/0803; H04L 41/0813; H04L 41/0893; H04L 63/10
See application file for complete search history.

(56) References Cited

U.S. PATENT DOCUMENTS

| | | | |
|---|---|---|---|
| 2006/0090195 A1* | 4/2006 | Pearson | H04L 67/02 726/3 |
| 2014/0334492 A1* | 11/2014 | Mack-Crane | H04L 69/22 370/392 |
| 2015/0149813 A1* | 5/2015 | Mizuno | G06F 11/1484 714/4.11 |
| 2016/0099948 A1* | 4/2016 | Ott | H04L 63/0281 726/1 |
| 2017/0223060 A1* | 8/2017 | Hayes | H04L 63/164 |
| 2017/0371716 A1* | 12/2017 | Gujar | G06F 9/5077 |
| 2018/0176185 A1* | 6/2018 | Kumar | H04L 63/104 |
| 2019/0141169 A1* | 5/2019 | Ni | H04L 69/329 |
| 2020/0004589 A1* | 1/2020 | Geiger | H04L 41/0823 |

* cited by examiner

*Primary Examiner* — Jeong S Park
(74) *Attorney, Agent, or Firm* — Thomas Horstemeyer, LLP (57) ABSTRACT

Disclosed are various approaches for remotely hosted management of network virtualization. In one approach, an administrative user at a client device is authenticated by a computing device for access to manage a network located remotely from the computing device. One or more commands are received from the client device to configure a software-defined networking rule for the network. The computing device communicates with one or more services on the network to implement the software-defined networking rule. A status of implementing the software-defined networking rule is reported to the client device.

19 Claims, 7 Drawing Sheets

REMOTELY HOSTED MANAGEMENT OF NETWORK VIRTUALIZATION

BACKGROUND

Network virtualization with software-defined networking offers many advantages over traditional computer networks. Traditional computer networks were designed with static architectures built around fixed physical links that interconnect networking equipment. Traditional networks can be difficult to troubleshoot and configure due to the many different pieces of networking gear that can be involved, such as switches, routers, and firewalls. Software-defined networking separates the process of forwarding packets from the process of routing packets. As a result, network intelligence can be moved into one or more controllers that are responsible for routing decisions. This makes reconfiguration and troubleshooting much easier and straightforward than with the traditional model.

Further, without the constraints of physical network divisions, a network can be virtually divided into many smaller segments, called microsegments. Microsegmentation can allow for creation of segments for particular purposes, thereby separating network hosts that do not need to communicate with one another and enhancing computer security. To enable microsegmentation, firewalling functions can be distributed throughout the network.

Network virtualization is typically managed through the use of a monolithic network appliance deployed on the network. This management appliance can provide information about the network status and receive user commands to configure or reconfigure the network. Unfortunately, there are a number of issues with these management appliances.

First, such network appliances are not scalable. If increased capacity is required, the network appliance is replaced or moved to a device with more computing resources. Second, network appliances can be difficult to upgrade. Administrators can delay installation of updates, which can result in security vulnerabilities or poor operating condition due to a lack of bug fixes or enhanced features. Third, the network appliances are not capable of multi-tenancy, so separate network appliances would be installed on respective individual networks. These problems can result in customer dissatisfaction or a failure to adopt network virtualization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for providing remote hosting of a management plane for network virtualization. The management plane in network virtualization or software-defined networking is the part of the architecture that facilitates configuration, status reporting, troubleshooting, and/or other management functions for the network. The management plane has typically been implemented by way of a network appliance installed on the network, which has many drawbacks in terms of scalability, upgradability, and flexibility.

Examples of the present disclosure introduce approaches for remotely hosting this management plane. The management plane can be hosted by a "cloud" platform, where the customer is provided the management plane as a service under a utility computing model. As such, the customer need not be aware of the underlying computer hardware to implement the management functions, and the management plane can be upgraded and scaled as desired on behalf of the customer. In addition, the framework can be developed to facilitate multi-tenancy, such that multiple customers can share a single installation of the management plane, or a single customer having separate networks can use a single installation of the management plane to manage the networks. This avoids the expense of running multiple network appliances for management purposes on separate networks.

Figure 1:
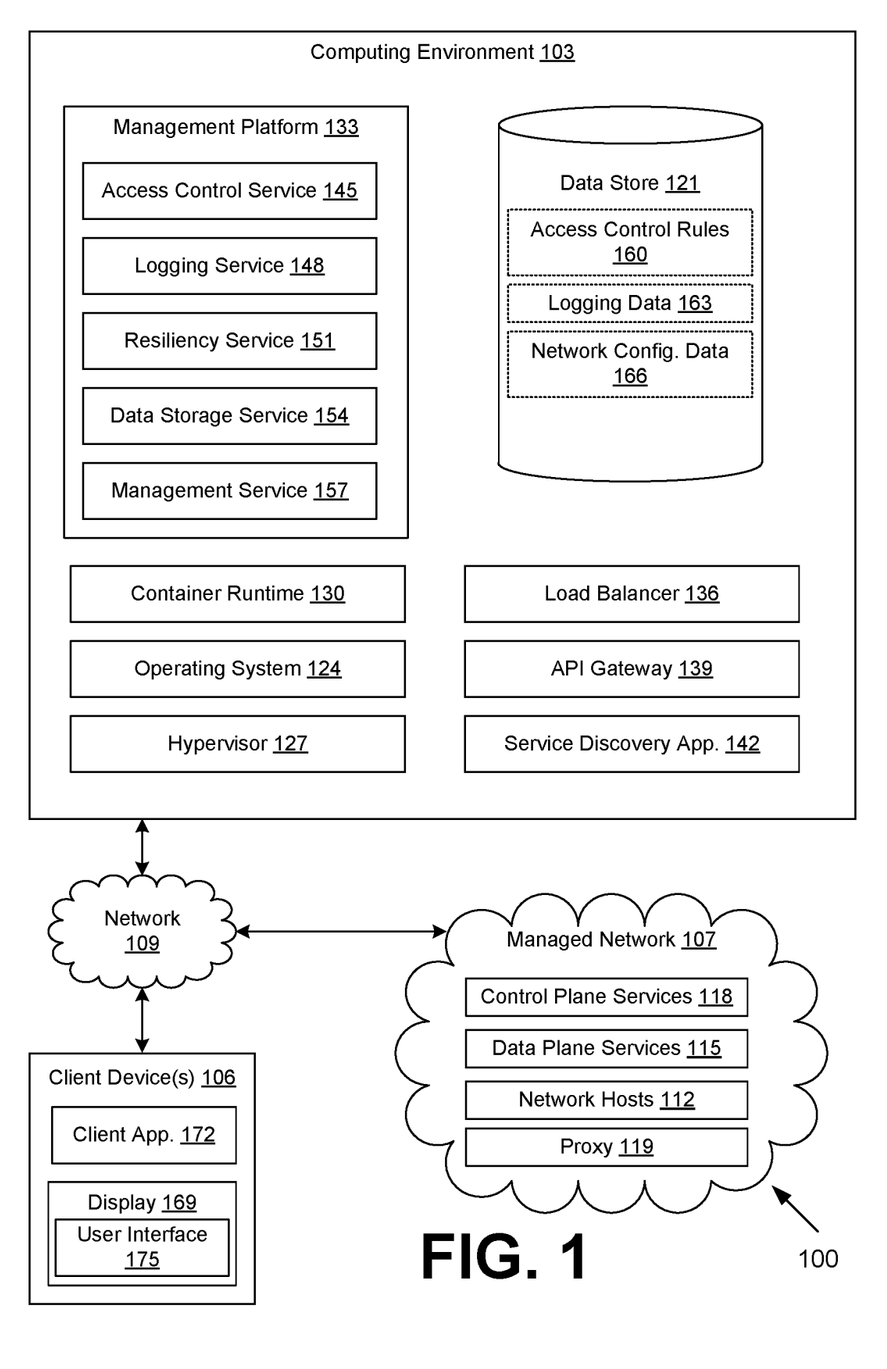
FIG. 1 is a drawing of a networked environment according to various examples of the disclosure.

With reference to FIG. 1, shown is a networked environment 100 according to various examples. The networked environment 100 includes a computing environment 103, one or more client devices 106, and a managed network 107 in communication by way of network 109. The managed network 107 and the network 109 can include, for example, wide area networks (WANs), local area networks (LANs), wired networks, wireless networks, other suitable networks, or any combination of two or more networks. For example, the managed network 107 and network 109 can include satellite networks, cable networks, Ethernet networks, and other types of networks. The network 109 can include the public Internet.

The managed network 107 corresponds to a network of an organization or enterprise. The managed network 107 implements software-defined networking and networking virtualization such that the control plane is separated from the data plane. This enables microsegmentation, or the creation of many small virtual segments of the managed network 107 for specific purposes. The managed network 107 can include network hosts 112, data plane services 115, and control plane services 118. The network hosts 112 can correspond to workstations, client devices, server devices, network appliances, and/or other components connected to the managed network 107. The data plane services 115 are responsible for forwarding data packets on the managed network 107. The control plane services 118 are responsible for making routing decisions on the managed network 107. In some implementations, the managed network 107 can include a proxy 119 to facilitate communication with the computing environment 103 using a network tunnel.

The computing environment 103 can be a computing environment that is operated by an enterprise, such as a business or other organization, which can be separate from the organization operating the managed network 107. To this end, the computing environment 103 can be located remotely from the managed network 107. The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted computing environment.

Various applications and/or other functionality can be executed in the computing environment 103. The data store 121 can be representative of a plurality of data stores as can be appreciated. The data stored in the data store 121, for example, is associated with the operation of the various applications and/or functional entities described below.

The components executed on the computing environment 103, for example, include an operating system 124, a hypervisor 127, a container runtime 130, a management platform 133, a load balancer 136, an application programming interface (API) gateway 139, a service discovery application 142, and other applications, services, processes, systems, engines, or functionality not discussed in detail herein. The operating system 124 can correspond to commercially available operating systems such as MICROSOFT WINDOWS, LINUX, and so on, and can be running directly on the underlying hardware or as a virtual machine instance managed by a hypervisor 127.

The container runtime 130 is executed to manage the execution of the management platform 133 in a container under the operating system 124. For example, the container runtime 130 can manage deployment and scaling of the management platform 133 so that the computing resources allocated to the management platform 133 can be increased or decreased in response to demand. A commercially available example of a container runtime 130 is KUBERNETES.

The load balancer 136 is executed to receive requests directed to the management platform 133 and direct the requests to one or more instances of the management platform 133. This can balance out the load experienced by any one of the instances of the management platform 133, thereby evening out the performance across the different instances so that any one instance does not experience overload conditions.

The API gateway 139 is executed to receive commands and queries from client devices 106 over the network 109 using an API and to present those commands and queries to the management platform 133. The API gateway 139 can also format operational status data from the management platform 133 and obtain results of commands and queries and return the status and result data to the client device 106 over the network 109.

The service discovery application 142 is executed to automatically detect services on the managed network 107. The service discovery application 142 uses a service discovery protocol to help accomplish service discovery. Through the use of service discovery, the need for manual configuration by users is reduced.

The management platform 133 is executed in order to manage the manage network 107. Unlike conventional management planes that are deployed on appliances in the managed network 107, the management platform 133 is deployed in the hosted environment of the computing environment 103, which is located remotely from the managed network 107 over the network 109, which can include the public Internet. The management platform 133 can be containerized and managed itself by the container runtime 130. Thus, multiple instances of the management platform 133 can be created in order to scale computing resources allocated to the management platform 133. Such instances can be executed on different virtual machine instances and executed on different underlying computing hardware.

The management platform 133 interacts with administrative users at client devices 106 in order to allow the users to issue management commands and queries that result in a configuration or reconfiguration of the managed network 107. Also, the management platform 133 can allow the users to obtain operational status information from the managed network 107.

The management platform 133 can include a plurality of different components such as an access control service 145, a logging service 148, a resiliency service 151, a data storage service 154, a management service 157, and/or other components. The access control service 145 enforces a rule-based access control system for accessing the management platform 133, performing commands, and/or obtaining status information. The access control service 145 can authenticate administrative users with an approaches like OAUTH2, OPEN ID CONNECT, and so on. For example, the access control service 145 can support single sign-on. Different users can be granted different privileges, and some actions can be restricted to users having a heightened privilege level.

The logging service 148 can log actions taken using the management platform 133 and operational status information relating to the managed network 107, such as operational status information for control plane services 118, data plane services 115, and the network hosts 112. The logging service 148 can provide for retrieval of logging information for authenticated users.

The resiliency service 151 can be executed to assure that the various components of the management platform 133 are operating. If a component is crashed, stalled, or otherwise nonresponsive, the resiliency service 151 can cause that component to be restarted.

The data storage service 154 facilitates data storage in and data retrieval from the data store 121. For example, the data storage service 154 can support key-value pair storage, such that a data value is stored and retrieved using a key that is an index.

The management service 157 receives commands from authenticated users and in response to those commands effects configuration changes to the managed network 107. To this end, the management service 157 can communicate with the control plane services 118 and/or other services on the managed network 107 to make changes to their configurations. The communication can be accomplished in some cases using a network tunnel over the network 109 to reach a proxy 119 on the managed network 107, where the control network traffic originates through the proxy 119 on the managed network 107. The management service 157 can generate various user interfaces, such as dashboards, to report operational status information relating to the managed network 107 and allow the user to issue commands that, for example, allow for configuration of software-defined networking such as creating or modifying microsegments or configuring a distributed firewall.

It is noted that the computing environment 103 can have a multi-tenant architecture and various services, e.g., the API gateway 139, load balancer 136, etc., can be shared among multiple instances of the management platform 133 corresponding to different customers or managed networks 107.

The data stored in the data store 121 includes, for example, access control rules 160, logging data 163, network configuration data 166, among other data. The access control rules 160 indicate to which operations or interfaces particular users will have access. The access control rules 160 can include security credentials or other rules that control authentication (e.g., geofences). The logging data 163 corresponds to data generated by the logging service 148 and/or other services configured to record their operational data to the data store 121. The network configuration data 166 corresponds to the current, previous, and/or future configurations of the managed network 107, which can include configuration for software-defined networking such as microsegments and distributed firewalls.

The client device 106 is representative of a plurality of client devices 106 that can be coupled to the network 109. The client device 106 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 can include a display 169 comprising, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 106 can be configured to execute a client application 172 for communicating with the computing environment 103 to manage the managed network 107. The client application 172 can render a user interface 175 on the display 169. In one implementation, the client application 172 is a special-purpose application for interacting with the management platform 133, and the client application 172 can render user interfaces with data obtained through the API gateway 139 and then send data entered by a user to the API gateway 139. In another implementation, the client application 172 is a browser application that renders network pages, such as web pages, generated by the management service 157.

Figure 2:
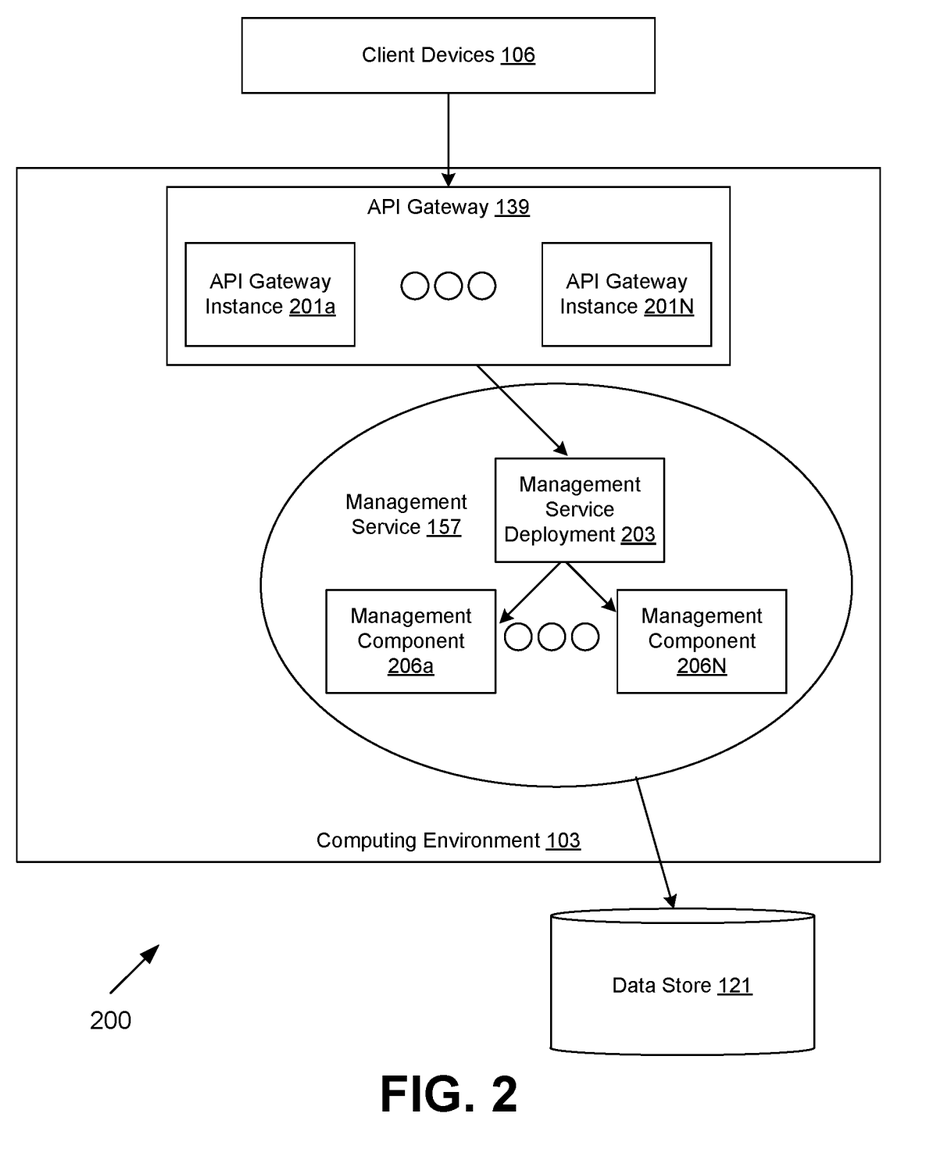
FIG. 2 is a diagram illustrating an example relationship among components in the networked environment of FIG. 1.

Moving on to FIG. 2, shown is a diagram 200 illustrating an example relationship among components in the networked environment 100 (FIG. 1). The client devices 106 communicate with the API gateway 139 in the computing environment 103, which can include a plurality of API gateway instances 201a . . . 201N that can be load balanced. An API gateway instance 201 routes a command or query from the client device 106 to a management service 157 within the computing environment 103. The command or query is routed to a specific management service deployment 203 of multiple potential deployments if the computing environment 103 is multi-tenant. The management service deployment 203 then routes the command or query to one or more management components 206a . . . 206N. The management components 206 can communicate with the data store 121.

As updates are necessary or desired, the management components 206 can be updated without causing downtime. For example, an updated management component 206 can be rolled out alongside an existing management component 206. The existing management component 206 can then be removed. In another scenario, a duplicate computing environment 103 can be instantiated running alongside the existing computing environment 103. The updates can then be performed to the duplicate computing environment 103. Once the updates are finished and the system is stable, the incoming requests can be switched over to the new computing environment 103. This approach offers the ability to roll back to the previous computing environment 103 if something goes wrong in the duplicate computing environment 103.

Figure 3:
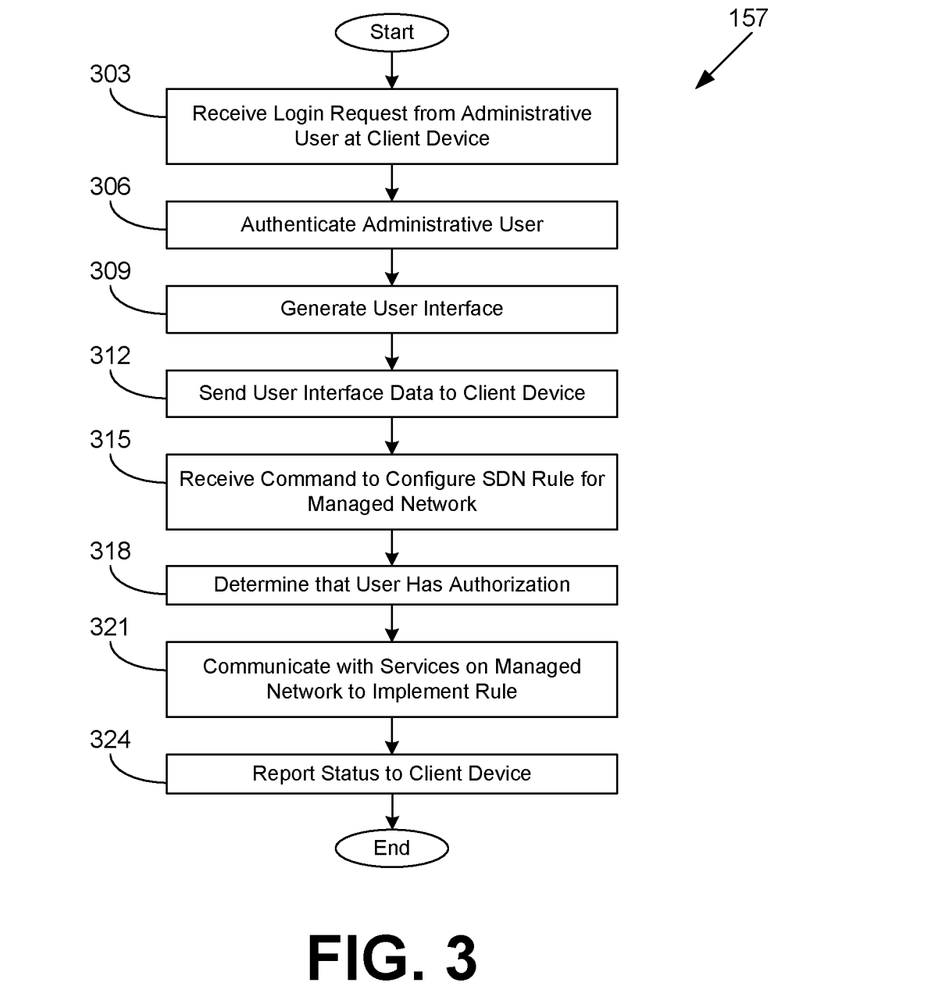
FIGS. 3-6 are flowcharts illustrating examples of functionality implemented in a hypervisor according to various examples of the present disclosure.

Referring next to FIG. 3, shown is a flowchart that provides one example of the operation of the management service 157. Functionality attributed to the management service 157 can be implemented in a single process or application or in multiple processes or applications. The separation or segmentation of functionality as discussed herein is presented for illustrative purposes only.

Beginning with step 303, the management service 157 receives a login request through the network 109 from an administrative user using a client application 172 executed on a client device 106. For example, the login request can specify a username, a password, and/or other security credentials. At step 306, the management service 157 authenticates the administrative user by way of the access control service 145 and confirms the validity of the specified credentials and any other requirements (e.g., geofencing and/or other risk-based requirements).

At step 309, the management service 157 generates a user interface 175 for configuring or viewing the status of the managed network 107. At step 312, the management service 157 sends the user interface data to the client device 106 through the network 109. At step 315, the management service 157 receives at least one command to configure a software-defined networking rule for the managed network 107 from the client device 106 through the network 109.

At step 318, the management service 157 determines that the user has authorization by way of the access control service 145 and with reference to one or more access control rules 160. If the user does not have authorization, the management service 157 can return an error message such as access denied.

At step 321, the management service 157 communicates with one or more services on the managed network 107, such as the control plane services 118 or the data plane services 115, to implement the software-defined networking rule in response to the commands. The management service 157 can also update the network configuration data 166 in the data store 121. At step 324, the management service 157 can report the status of implementing the software-defined networking rule to the client device 106. For example, the management service 157 can indicate that the rule was implemented successfully, or the management service 157 can indicate that there was a problem, conflict, or delay in implementing the rule.

Figure 4:
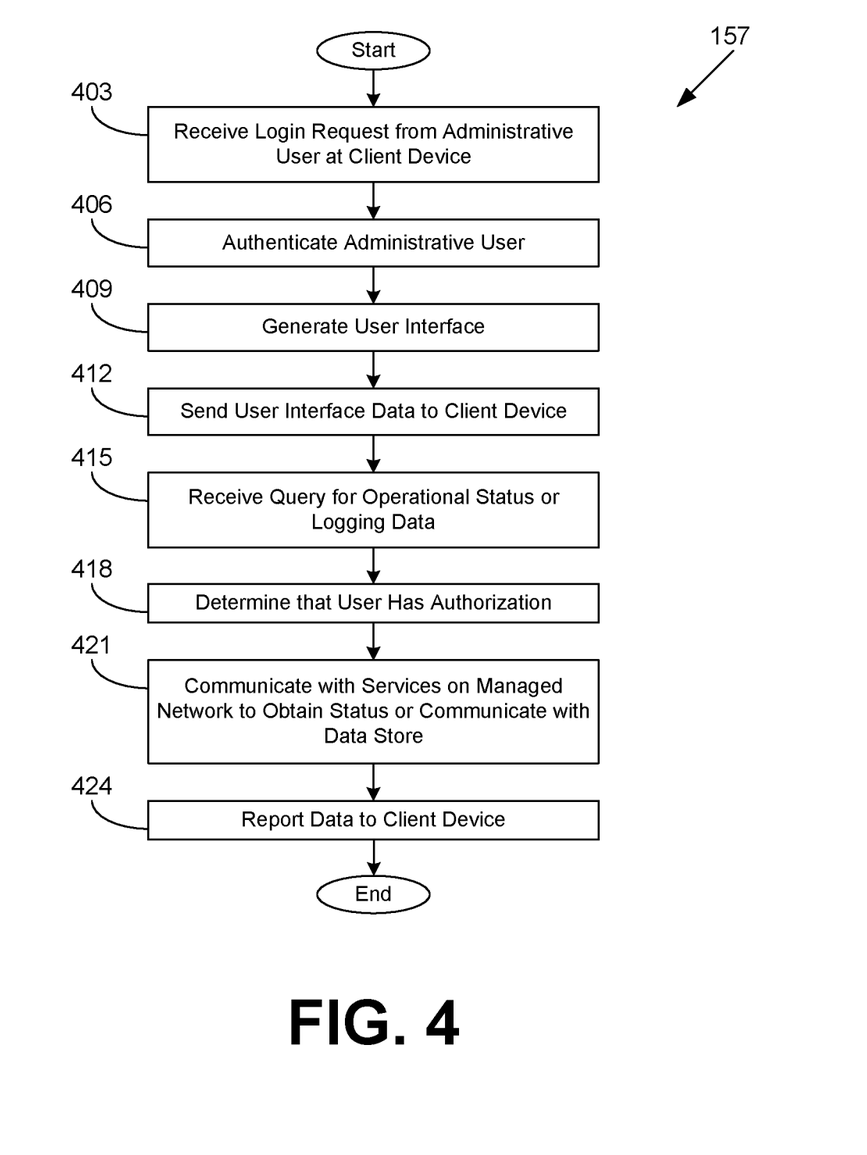

Turning now to FIG. 4, shown is a flowchart that provides another example of the operation of the management service 157. Functionality attributed to the management service 157 can be implemented in a single process or application or in multiple processes or applications. The separation or segmentation of functionality as discussed herein is presented for illustrative purposes only.

Beginning with step 403, the management service 157 receives a login request through the network 109 from an administrative user using a client application 172 executed on a client device 106. For example, the login request can specify a username, a password, and/or other security credentials. At step 406, the management service 157 authenticates the administrative user by way of the access control service 145 and confirms the validity of the specified credentials and any other requirements (e.g., geofencing and/or other risk-based requirements).

At step 409, the management service 157 generates a user interface 175 for configuring or viewing the status of the managed network 107. At step 412, the management service 157 sends the user interface data to the client device 106 through the network 109. At step 415, the management service 157 receives at least one command or query to view the operational status of the managed network 107 from the client device 106 through the network 109. As an alternative, the command or query can relate to viewing logging data 163 regarding past events regarding the managed network 107 or the computing environment 103 and logged by the logging service 148.

At step 418, the management service 157 determines that the user has authorization by way of the access control service 145 and with reference to one or more access control rules 160. If the user does not have authorization, the management service 157 can return an error message such as access denied.

At step 421, the management service 157 communicates with one or more services on the managed network 107, such as the control plane services 118 or the data plane services 115, to obtain operational status information, or the management service 157 communicates with the data store 121 using the data storage service 154 to obtain the logging data 163. At step 424, the management service 157 can report the operational status data or the logging data 163 to the client device 106 through a user interface 175.

Figure 5:
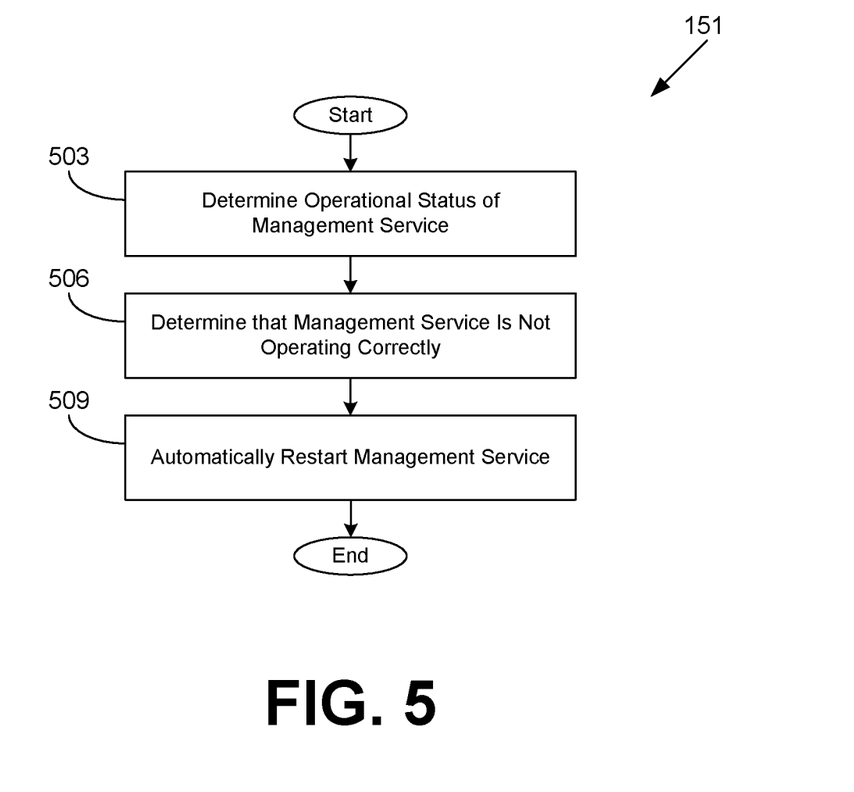

Moving on to FIG. 5, shown is a flowchart that provides one example of the operation of the resiliency service 151. Functionality attributed to the resiliency service 151 can be implemented in a single process or application or in multiple processes or applications. The separation or segmentation of functionality as discussed herein is presented for illustrative purposes only.

Beginning with step 503, the resiliency service 151 determines the operational status of the management service 157 and/or other services in the computing environment 103. For example, the resiliency service 151 can query the services for a current status or examine resources consumed through the operating system 124 (e.g., processor, memory, or network utilization). At step 506, the resiliency service 151 can determine that the management service 157 or other service is not operating correctly. At step 509, in response to determining that the management service 157 or other service is not operating correctly, the resiliency service 151 can automatically restart the management service 157 or other services. In some scenarios, the resiliency service 151 can restart the operating system 124 or virtual machine instance upon which the management service 157 or management platform 133 is executing.

Figure 6:
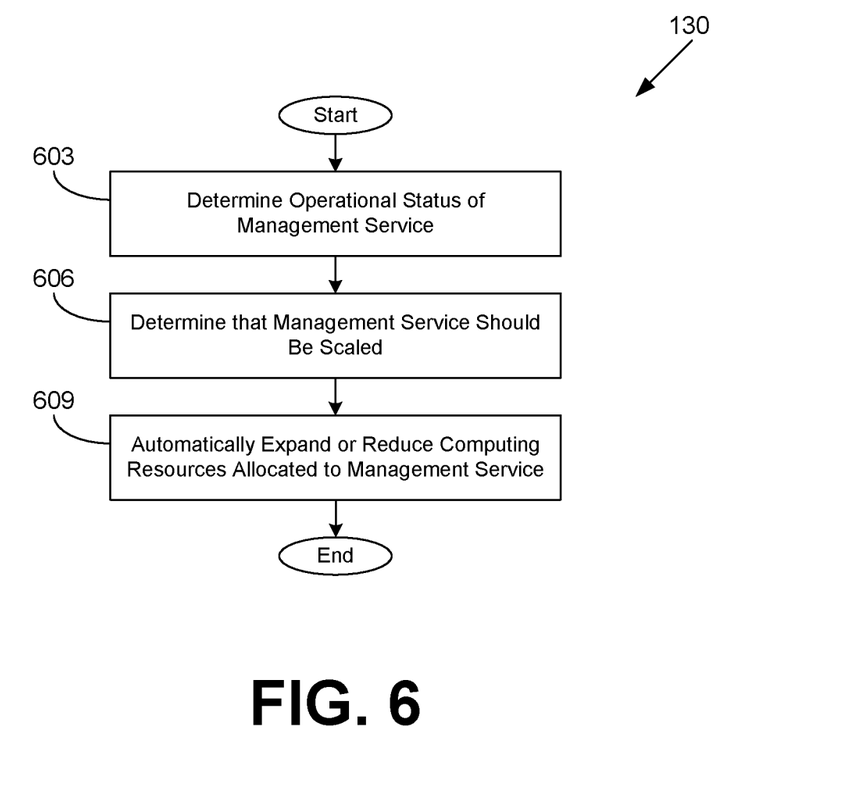

Continuing to FIG. 6, shown is a flowchart that provides one example of the operation of the container runtime 130. Functionality attributed to the container runtime 130 can be implemented in a single process or application or in multiple processes or applications. The separation or segmentation of functionality as discussed herein is presented for illustrative purposes only.

Beginning with step 603, the container runtime 130 determines the operational status of the management service 157 and/or other services in the computing environment 103. For example, the container runtime 130 can query the services for a current status or examine resources consumed through the operating system 124 (e.g., processor, memory, or network utilization). At step 606, the container runtime 130 can determine that the management service 157 and/or other services should be scaled up or scaled down. For example, the container runtime 130 can determine that the management service 157 is handling too many requests and should be scaled up, or the container runtime 130 can determine that the management service 157 is handling few requests and can be scaled down to conserve computing resources.

At step 609, the container runtime 130 can automatically expand or reduce the computing resources allocated to the management service 157 and/or other services. For example, the container runtime 130 can create new instances of the management service 157 or management components 206, transfer the existing instances to a machine instance with greater computing resources, or reconfigure a virtual machine instance to have greater computing resources. Alternatively, the container runtime 130 can terminate instances of the management service 157, shift the existing instances to a machine instance with fewer computing resources, or reconfigure a virtual machine instances to have fewer computing resources.

Figure 7:
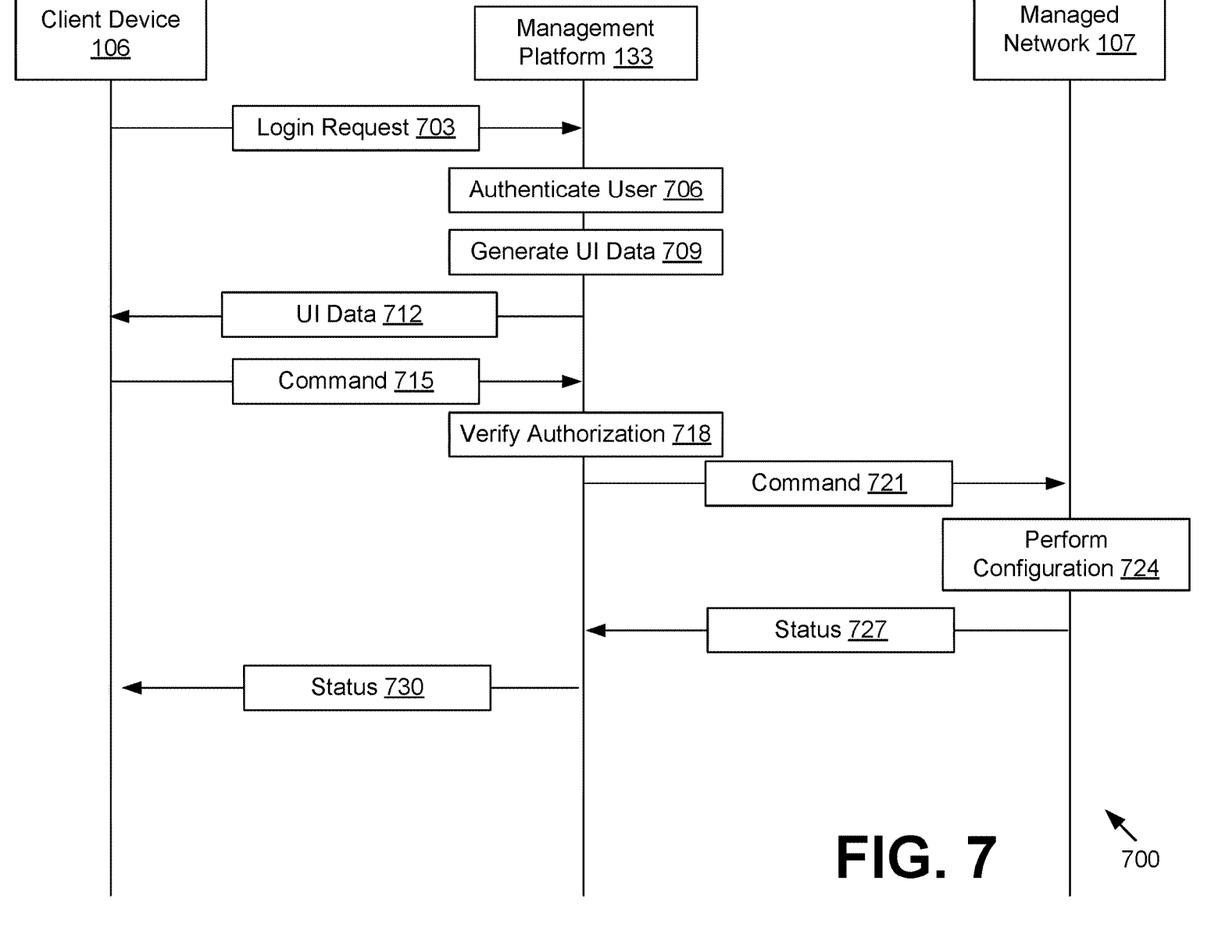
FIG. 7 is a sequence diagram illustrating example component interactions according to various examples of the present disclosure.

Turning now to FIG. 7, shown is a sequence diagram 700 illustrating one example of interaction between a client device 106, a management platform 133, and a managed network 107. Functionality attributed to the client device 106, the management platform 133, and the managed network 107 can be implemented in fewer processes or applications or in additional processes or applications. The separation or segmentation of functionality as discussed herein is presented for illustrative purposes only.

Beginning with step 703, the client device 106 sends a login request over the network 109 to the management platform 133, which can go through potentially a load balancer 136 and then the API gateway 139. For example, an administrative user can launch a client application 172, and enter a username and security credential in order to request administrative access for the managed network 107. At step 706, the access control service 145 can authenticate the user by verifying the security credentials and evaluating any other factors, such as whether the client device 106 is within a required geofence.

At step 709, the management service 157 generates data encoding a user interface 175 for managing the managed network 107. The management service 157 then sends the user interface data to the client device 106 over the network 109 at step 712. The user interface data can be returned through the API gateway 139.

At step 715, one or more commands relating to configuring a software-defined network rule or obtaining operational status information are sent from the client device 106 to the management service 157 through the network 109 and the API gateway 139. For example, the rule being configured can pertain to configuring a distributed firewall and/or a virtual segment on the managed network 107. At step 718, the access control service 145 verifies that the authenticated user has proper authorization to perform the command. The management service 157 then sends the command to the managed network 107 at step 721.

The managed network 107 can be located remotely from the computing environment 103, and the command can be sent to one or more control plane services 118, one or more data plane services 115, or one or more network hosts 112 to perform the reconfiguration at step 724. In one implementation, the command is sent from the management service 157 to the managed network 107 through a network tunnel over the network 109 to a proxy 119. Such tunneling can be helpful if various inbound or outbound ports are blocked from the network 109 to the managed network 107.

After performing the reconfiguration, the managed network 107 can report status information to the management platform 133 at step 727. The management platform 133 can update the network configuration data 166 based on the reconfiguration and also the logging data 163 to document the command that was performed. The management platform 133 then returns the status information to the client device 106 over the network 109 at step 730.

The flowcharts of FIGS. 3-6 and the sequence diagram of FIG. 7 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-6 and the sequence diagram of FIG. 7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the computing environment 103, the client device 106, the managed network 107, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management platform 133 and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, or flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for management of network virtualization, comprising:

a computing device comprising a processor and a memory; and machine readable instructions stored in the memory that, when executed by the processor, cause the computing device to at least:

authenticate an administrative user at a client device for access to a managed network located remotely from the computing device, wherein the managed network comprises a data plane service and a control plane service for a virtual segment of the managed network, wherein the data plane service is configured to determine a forwarding decision for a data packet and the control plane service is configured to determine a routing decision for the data packet;

receive at least one command from the client device to configure a software-defined networking rule for the managed network, wherein the software-defined networking rule is configured to set a data packet forwarding configuration for the data plane service and a data packet routing configuration for the control plane service;

communicate with one or more services on the managed network to implement the software-defined networking rule in response to receiving the at least one command, wherein the one or more services comprise the data plane service and the control plane service; and report a status of implementing the software-defined networking rule to the client device.

2. The system of claim 1, wherein the machine readable instructions, when executed by the processor, further cause the computing device to at least:

communicate with the one or more services on the managed network to determine an operational status of the managed network; and send data encoding the operational status to the client device.

3. The system of claim 1, wherein the machine readable instructions, when executed by the processor, further cause the computing device to at least communicate with the one or more services on the managed network to implement the software-defined networking rule using a network tunnel over a public network to reach the one or more services on the managed network.

4. The system of claim 1, wherein the machine readable instructions, when executed by the processor, further cause the computing device to at least:
generate a user interface for receiving the at least one command from the administrative user; and
send data encoding the user interface to the client device.

5. The system of claim 1, wherein the machine readable instructions, when executed by the processor, further cause the computing device to at least receive the at least one command from a client application executed on the client device using an application programming interface (API).

6. The system of claim 1, wherein the machine readable instructions, when executed by the processor, further cause the computing device to at least automatically update a management service executed by the computing device for managing the managed network.

7. The system of claim 1, wherein the machine readable instructions, when executed by the processor, further cause the computing device to at least:
determine an operational status of a management service executed by the computing device for managing the managed network;
determine from the operational status that the management service is not operating correctly; and
automatically restart the management service.

8. The system of claim 1, wherein the machine readable instructions, when executed by the processor, further cause the computing device to at least automatically expand or reduce computing resources allocated to a management service executed by the computing device for the managed network.

9. The system of claim 1, wherein the software-defined networking rule further configures a distributed firewall on the managed network.

10. The system of claim 1, wherein the software-defined networking rule configures the virtual segment of the managed network independently from a physical division of the network.

11. A method for management of network virtualization, comprising:
authenticating, by a computing device comprising a processor and a memory, an administrative user at a client device for access to a managed network located remotely from the computing device, wherein the managed network comprises a data plane service and a control plane service for a virtual segment of the managed network, wherein the data plane service is configured to determine a forwarding decision for a data packet and the control plane service is configured to determine a routing decision for the data packet;
receiving at least one command by the computing device from the client device to configure a software-defined networking rule for the managed network, wherein the software-defined networking rule is configured to set a data packet forwarding configuration for the data plane service and a data packet routing configuration for the control plane service;
communicating with one or more services on the managed network to implement the software-defined networking rule in response to receiving the at least one command, wherein the one or more services comprise the data plane service and the control plane service; and
reporting a status of implementing the software-defined networking rule to the client device.

12. The method of claim 11, further comprising:
communicating with the one or more services on the managed network from the computing device to determine an operational status of the managed network; and
sending data encoding the operational status to the client device.

13. The method of claim 11, further comprising communicating with the one or more services on the managed network to implement the software-defined networking rule using a network tunnel over a public network to reach the one or more services on the managed network.

14. The method of claim 11, further comprising:
generating a user interface for receiving the at least one command from the administrative user; and
sending data encoding the user interface to the client device.

15. The method of claim 11, further comprising automatically updating a management service executed by the computing device for managing the managed network.

16. The method of claim 11, further comprising:
determining an operational status of a management service executed by the computing device for the managed network;
determining from the operational status that the management service is not operating correctly; and
automatically restarting the management service.

17. The method of claim 11, further comprising automatically expanding or reducing computing resources allocated to a management service executed by the computing device for the managed network.

18. The method of claim 11, wherein the software-defined networking rule further configures a distributed firewall on the managed network.

19. A non-transitory computer readable medium comprising machine readable instructions that, when executed by a processor of a computing device, cause the computing device to at least:
authenticate an administrative user at a client device for access a managed network located remotely from the computing device, wherein the managed network comprises a data plane service and a control plane service for a virtual segment of the managed network, wherein the data plane service is configured to determine a forwarding decision for a data packet and the control plane service is configured to determine a routing decision for the data packet;
receive at least one command from the client device to configure a software-defined networking rule for the network, wherein the software-defined networking rule is configured to set a data packet forwarding configuration for the data plane service and a data packet routing configuration for the control plane service;
communicate with one or more services on the managed network to implement the software-defined networking rule in response to receiving the at least one command, wherein the one or more services comprise the data plane service and the control plane service; and
report a status of implementing the software-defined networking rule to the client device.

* * * * *